US007088781B2

(12) United States Patent
Betts

(10) Patent No.: US 7,088,781 B2
(45) Date of Patent: *Aug. 8, 2006

(54) TONE ORDERED DISCRETE MULTITONE INTERLEAVER

(75) Inventor: William L. Betts, St. Petersburg, FL (US)

(73) Assignee: Paradyne Corporation, Largo, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 766 days.

(21) Appl. No.: 09/766,255

(22) Filed: Jan. 17, 2001

(65) Prior Publication Data

US 2001/0031011 A1   Oct. 18, 2001

Related U.S. Application Data

(63) Continuation-in-part of application No. 09/736,353, filed on Dec. 14, 2000.

(60) Provisional application No. 60/170,891, filed on Dec. 15, 1999.

(51) Int. Cl.
*H04L 27/28* (2006.01)
*H04B 1/38* (2006.01)

(52) U.S. Cl. ...................... 375/260; 375/222

(58) Field of Classification Search ............... 375/222, 375/259, 260, 261, 341
See application file for complete search history.

(56) References Cited

U.S. PATENT DOCUMENTS

| 4,641,327 A | 2/1987 | Wei ............................. 375/114 |
| 4,660,214 A | 4/1987 | Pahlavan et al. ............. 375/39 |
| 4,677,625 A | 6/1987 | Betts et al. ................... 371/43 |
| 5,400,322 A | 3/1995 | Hunt et al. .................... 370/19 |
| 5,659,578 A | 8/1997 | Alamouti et al. ........... 375/261 |
| 5,822,374 A * | 10/1998 | Levin .......................... 375/260 |
| 5,930,300 A | 7/1999 | Betts et al. .................. 375/285 |
| 6,084,906 A | 7/2000 | Kao et al. .................... 375/220 |
| 6,144,695 A | 11/2000 | Helms et al. ............... 375/222 |
| 6,498,808 B1 * | 12/2002 | Tzannes ..................... 375/225 |
| 6,674,768 B1 * | 1/2004 | Okamura .................... 370/468 |

OTHER PUBLICATIONS

International Telecommunication Union, "Asymmetrical Digital Subscriber Line (ADSL) transceivers", Series G: Transmission Systems and Media, Digital Systems and Networks; Digital transmission systems-Access networks; G.992.1 (Jun. 1999).
G.gen-bis—Robuster Tone Ordering and Flexible Pilot Allocation, Jun. 21-Jul. 2, 1999.
G.gen-bis—More Robust Tone Ordering, in the Presence of real AM RFI, Feb. 5-9, 2001.
"Multicarrier Modulation for Data Transmission: An Idea Whose Time Has Come" by John A.C. Bingham, Published May 1990 in IEEE Communications Magazine.

* cited by examiner

*Primary Examiner*—Jay K. Patel
*Assistant Examiner*—David B. Lugo
(74) *Attorney, Agent, or Firm*—Thomas, Kayden, Horstemeyer & Risley LLP

(57) ABSTRACT

A tone ordered discrete multitone interleaver system and method, including a tone ordered interleaver and deinterleaver, are provided for efficiently communicating data despite noise affecting a Discrete Multitone modulation (DMT) system. The tone ordered discrete multitone interleaver forces interleaving of trellis encoded information by assigning a different number of bits to adjacent tones or adjacent tone pairs.

25 Claims, 4 Drawing Sheets

Discrete Multitone Deinterleaver

TONE ORDERED DISCRETE MULTITONE INTERLEAVER

CROSS-REFERENCE TO RELATED APPLICATIONS

This application is a continuation-in-part of copending U.S. utility application entitled, "Discrete Multitone Interleaver," having Ser. No. 09/736,353, filed Dec. 14, 2000. U.S. utility application Ser. No. 09/736,353 claims priority to U.S. provisional application entitled, "Discrete Multi-Tone Trellis Interleaver," having Ser. No. 60/170,891, filed Dec. 15, 1999. U.S. utility application Ser. No. 09/736,353 and U.S. provisional application No. 60/170,891 are entirely incorporated herein by reference.

TECHNICAL FIELD

The present invention generally relates to communications and modems, and more particularly to a tone ordered discrete multitone interleaver system and method for efficiently minimizing noise distortion and enhancing data transmission communications.

BACKGROUND OF THE INVENTION

Communications devices, particularly those that implement digital subscriber line (DSL) technologies (e.g., T1 and xDSL, including SDSL, HDSL, ADSL, etc.), transmit high speed data using analog signals over telephone connections, which are typically copper wire pairs. The connections and equipment are subject to adverse impulse noise. Impulse noise events are likely correlated over several symbol (or baud) periods of the DSL modulation. Correlated noise or distortion undesirably will significantly degrade performance of the decoder associated with a receiver.

In order to minimize the adverse affects of noise, various forward error correction coding techniques (also known as convolutional coding) have been developed and employed in the past. Typically, in forward error correction coding, at the transmitter, data bits are encoded by adding redundant bits systematically to the data bits so that, normally, only predetermined transitions from one sequential group of bits (corresponding to a symbol, or baud) to another are allowed. There is an inherent correlation between these redundant bits over consecutive bauds. At the receiver, each baud is tentatively decoded and then analyzed based on past history, and the decoded bits are corrected, if necessary.

One well known and widely accepted error coding technique is trellis coded modulation (TCM), which is a form of convolutional coding that is optimized according to a specific modulation scheme. A TCM encoder is situated at the transmitter, and a TCM decoder is situated at the receiver. TCM is highly desirable since it combines the operations of modulation and error coding to provide effective error control coding without sacrificing power and bandwidth efficiency. The TCM decoder essentially averages the noise over more than one of the symbols. However, noise that is correlated over the constraint length of the trellis code will effectively degrade performance. In many cases, correlated noise causes the trellis decoder to perform worse than if the receiver employed no trellis coding at all.

As examples, U.S. Pat. No. 5,659,578 to Alamouti et al. and U.S. Pat. No. 4,677,625 to Betts et al. describe the concept of TCM. The latter describes a distributed trellis encoder that can be used to spread symbols associated with a data stream over time across successive symbol (baud) periods. This distributed encoder significantly improves performance by making the transmissions less susceptible to errors resulting from imposition of correlated noise. U.S. Pat. Nos. 5,659,578 and 4,677,625 are entirely incorporated herein by reference.

The various DSL technologies employ a variety of line coding, e.g. 2 Binary, 1 Quaternary (2B1Q), Quadrature Amplitude and Phase modulation (QAM), Carrierless Amplitude and Phase (CAP) modulation, and Discrete Multitone (DMT). DMT is now the standard line coding for Asymmetrical Digital Subscriber Line (ADSL) as specified in international standards published by the ITU (International Telecommunication Union) as Recommendations G.992.1 Series G: Transmission Systems and Media, Digital Systems and Networks, Digital Transmission Systems—Access Networks ADSL Transceivers, and G.992.2 Splitterless ADSL transceivers. G.992.1 and G.992.2 are available from the ITU, Geneva, Switzerland, at http://vww.itu.int and are entirely incorporated herein by reference.

DMT is a Frequency Division Multiplex (FDM) type of modulation in which an incoming bit stream is multiplexed into a number of sub-carriers or sub-channels. DMT as used in ADSL enables a digital subscriber technology capable of delivering high-speed digital information over existing unshielded twisted pair copper telephone lines DMT encodes data on multiple sub-carriers, referred to as tones, that are then converted to time domain signals for transmission by an Inverse Discrete Fourier Transform (IDFT). An additional level of line coding, e.g. QAM, can be employed within each of the tones. A DMT trellis encoder generally codes between adjacent tones. DMT uses a Discrete Fourier Transform (DFT) to demodulate the tones.

The DMT 16-state trellis code constraint length is approximately four 4-dimensional symbols. Four-dimensional symbols are encoded as two 2-dimensional constellations on two tones. Four 4-dimensional symbols are thus encoded over eight tones. DFT suffers from performance limitations including sinx/x coupling of energy between adjacent tones. DMT convolutional encoders operate "serially" on mapped constellations such that consecutively generated constellations are mapped to adjacent tones. (Sin x)/x coupling allows noise on one tone to affect adjacent tones. Correlated noise on adjacent tones, particularly that within the DMT code constraint length, contributes to multiple metric calculations in the trellis decoder. Correlated noise in consecutive metric calculations causes negative gain and can result in a worse performance than if no coding was employed.

DSL technologies are still in a state of infancy and are being improved over time by engineers and designers. The industry still needs ways to further enhance DSL communications and, in particular, ways to minimize the adverse effects of impulse noise and correlated noise. Thus, a heretofore unaddressed need exists in the industry to address the aforementioned deficiencies and inadequacies.

SUMMARY OF THE INVENTION

The present invention provides a system for a tone ordered discrete multitone interleaver and a method for tone ordered interleaving across DMT tones. Several embodiments of tone ordered discrete multitone interleaving are described below.

The tone ordered discrete multitone trellis interleaver spreads trellis symbols across several carrier tones such that the metrics in the receiver are not correlated. The depth of the interleaver will determine the number of tones used to spread the symbol. Noise impacting adjacent tones will not appear in the metric calculations until a number of trellis symbols later. The number being equal to the depth of the interleaver. In effect, the tone ordered discrete multitone trellis interleaver causes the symbols to skip over correlated noise.

Related application Ser. No. 09/736,353 entitled "Discrete Multitone Interleaver" describes several discrete multitone interleavers and methods for tone ordered interleaving across DMT tones. Some of the described systems and methods show synchronized switches that may be difficult or expensive to implement in integrated circuits. Though not limited to integrated circuits, the tone ordered discrete multitone interleaver addresses the potential difficulties and expenses associated with implementing discrete multitone interleaving in integrated circuits.

Briefly described, in architecture, the system can be implemented in a transmitter and a receiver as follows. In the transmitter the tone ordered discrete multitoned interleaver includes a tone ordering element capable of assigning bits to a plurality of tones, and a bit and gain table, capable of designating that within a portion of the plurality of tones, a variable plurality of bits is assigned to each of the plurality of tones, and wherein the variable plurality of bits assigned to each of the plurality of tones is different from the variable plurality of bits assigned to each adjacent tone. Several non-exclusive ways to determine the variable plurality of bits to be assigned to the tomes are provided. The tone ordered discrete multitone deinterleaver receiver includes a bit ordering element that performs a complimentary re-ordering of the data coded by the transmitter.

The present invention can also be viewed as providing a method for transmitting tone ordered discrete multitoned interleaved data. In this regard, the method of transmitting data can be broadly summarized by the steps of: receiving bits and relative gain information designating a variable plurality of bits to be assigned to each of a plurality of tones, wherein the variable plurality of bits to be assigned to each of the plurality of tones is different from the variable plurality of bits to be assigned to each adjacent tone; and assigning bits to the plurality of tones based on the bits and relative gain information. The method of receiving data involves the step of reordering the data encoded by the tone ordered discrete multitoned interleaver.

In addition to other advantages described above, the tone ordered discrete multitone trellis interleaver provides improved coding gain. The tone ordered discrete multitone trellis interleaver provides these advantages without an increase in delay since the interleaving occurs between tones rather than between symbols in time.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
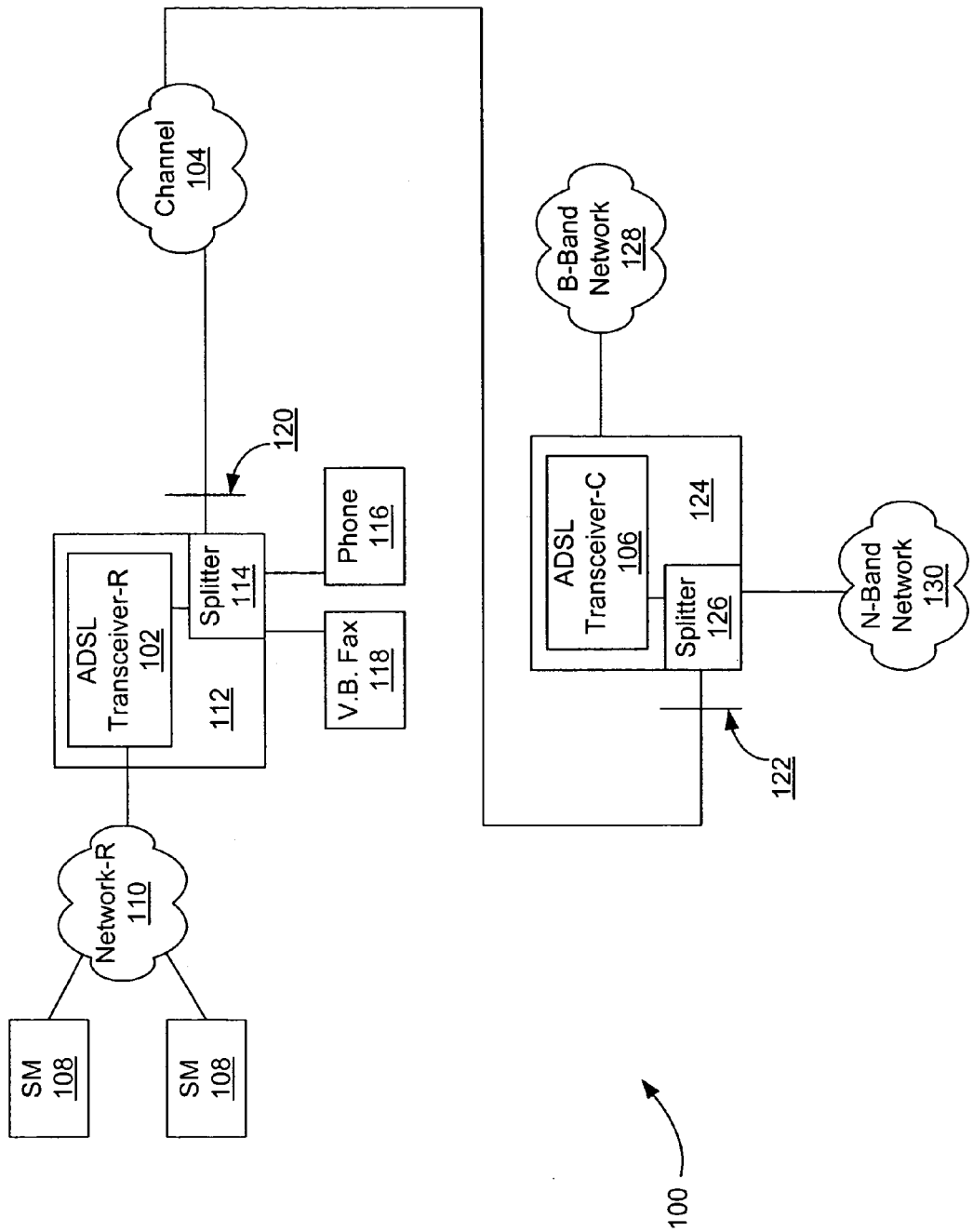
FIG. 1 is a block diagram of an ADSL transceiver system including an ADSL remote transceiver and an ADSL central transceiver.

The tone ordered discrete multitone interleaver system and associated methods will be specifically described hereafter in the context of a transmitter and a receiver at each end of DSL communication channel. The tone ordered discrete multitone system and associated methods as described in this context are intended to be possible nonexclusive examples of implementations. Numerous other embodiments are envisioned and are possible, as will be apparent to those with skill in the art.

The tone ordered discrete multitone interleaver system of the present invention allows trellis coding over multiple DMT tones. Although not limited to this particular application and any particular number of tones, the tone ordered discrete multitone interleaver system is particularly suited for use in connection with modems at opposing ends of telephone connections (wire pairs) extending between a central office (CO; defined as any facility having a telephone switch) associated with a telephone company and a customer premises (CP). The modems can employ any suitable modulation scheme, for example but not limited to, that prescribed by the industry standard V.34 that has been promulgated by the International Telecommunications Union (ITU). Many CPs already have two-wire pairs connecting them to the CO. The tone ordered discrete multitone interleaver system can effectively average the noise over multiple tones, for example, eight different tones, yielding better performance and longer DSL reach between the CO and CP equipment. In some cases, the tone ordered discrete multitone interleaver system provides data throughput where none was possible otherwise.

Note that in the embodiments, as described hereafter, the transmitters and receivers can be implemented in hardware, software, firmware, or a combination thereof. Preferably, all of the component parts of each, except the amplifier and transformer elements, are implemented in firmware that is stored in a memory (EPROM) and that is executed by a suitable instruction execution system, particularly, a digital signal processor (DSP) or general purpose microprocessor. The software/firmware can be stored and transported on any computer readable medium. If implemented in hardware, in whole or in part, as in alternative embodiments, the hardware components can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. The tone ordered discrete multitone interleaver may be particularly useful when discrete multitone interleaving, as described herein and in related application Ser. No. 09/736,353, is implemented in an ASIC.

Any process descriptions or blocks in figures should be understood as representing modules, segments, or portions of code which include one or more executable instructions for implementing specific logical functions or steps in the process, and alternate implementations are included within the scope of the embodiments of the present invention in which functions may be executed out of order from that shown or discussed, including substantially concurrently or in reverse order, depending on the functionality involved, as would be understood by those reasonably skilled in the art of the present invention.

The tone ordered discrete multitone interleaver program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable readonly memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

FIGS. 1-4 show one embodiment of the tone ordered discrete multitone interleaver. FIG. 5 shows one embodiment of the tone ordered discrete multitone deinterleaver for deinterleaving data processed by the tone ordered discrete multitone interleaver.

FIG. 1 shows a block diagram of an ADSL DMT transceiver system 100 showing the basic functional blocks and interfaces. The ADSL transceiver system includes an ALDSL remote transceiver (ADSL Transceiver-R) 102, a channel 104, and an ADSL central transceiver (ADSL Transceiver-C) 106. The ADSL Transceiver-R 102 is typically housed in an ADSL DMT modem 112. The ADSL Transceiver-C 106 is typically housed in a Digital Subscriber Line Access Multiplexer (DSLAM) 124. ADSL DMT transceiver system 100 shows a transmission system and method for data transport. Remote power feeding, which may be provided by the ADSL Transceiver-C, 106 is not shown.

In the ADSL DMT transceiver system 100, an ADSL circuit connects ADSL Transceiver-R 102 and ADSL Transceiver-C 106 on each end of a twisted-pair telephone line, creating three information channels—a high speed downstream channel, a medium speed duplex channel, and a plain old telephone service (POTS) channel. The POTS channel is split off from the digital modems by filters, thus guaranteeing uninterrupted POTS. The high speed channel ranges from 1.5 to 8 Mbps, while duplex rates range from 16 Kbps to 1 Mbps. Each channel can be submultiplexed to form multiple, lower rate channels.

The ADSL Transceiver-R 102 is typically located at a customer's premise and the ADSL Transceiver-C 106 is typically located at a telephone company's central office or remote location. As is known in the art, the ADSL Transceiver-C 106 acts as a master to some functions of the ADSL Transceiver-R 102. In a typical application, transmitter and receiver components will be incorporated into the same device so that each is capable of transmitting and receiving data. The tone ordered discrete multitone interleaver and associated tone ordered discrete multitone deinterleaver are incorporated into an ADSL DMT transmitter and an ADSL DMT receiver, respectively, at each end of the channel 104.

The ADSL Transceiver-R 102 includes an ADSL DMT transmitter 200, described in detail below and shown in FIG. 2. For ease in describing the ADSL transceiver system 100, the detailed description is provided from the perspective of passing information from the transmitter in the ADSL Transceiver-R 102 to the receiver in the ADSL Transceiver-C 106. Those skilled in the art will recognize an analogous analysis applies to the transmission of information from the ADSL Transceiver-C 106 to the ADSL Transceiver-R 102.

The ADSL DMT modem 112 may also contain a splitter 114 and other components known to those skilled in the art. The input to the ADSL Transceiver-R 102 may be a remote network (Network-R) 110. The remote network 110 may include service modules (SMs) 108. The service modules 108 may be personal computers, servers, routers, and many other devices known to those skilled in the art. A standard phone 116, a voice band facsimile (V.B. Fax) 118, and an ISDN device may be connected to the splitter 114. The splitter 114 contains filters that separate high frequency ADSL signals from voiceband signals such as the standard phone 116, the facsimile 118, and the ISDN device.

Prior to entering the channel 104, the signal from the ADSL DMT modem 112 passes through a loop interface remote terminal end (U-R) 120. The U-R 120 may be Synchronous Transfer Mode (STM) bit sync based or Asynchronous Transfer Mode (ATM) cell based.

The output of the loop interface remote terminal end 120 is passed through the channel 104 to the loop interface central office end (U-C) 122. As with the loop interface remote terminal end 120, loop interface central office end 122 may be Synchronous Transfer Mode (STM) bit sync based or Asynchronous Transfer Mode (ATM) cell based.

The ADSL DMT transmitter 200, within the ADSL Transceiver-R 102, processes the service modules 108 and remote network 110 signals for transmission to the ADSL DMT receiver 502, within the ADSL Transceiver-C 106, via the channel 104. The ADSL DMT transmitter 200 processing includes the tone ordered discrete multitone interleaving of the current invention. The ADSL DMT receiver 502 deprocesses the signal and passes the deprocessed signals to the Broadband (B-Band) Network 128 and the narrowband (N-Band) network 130. The ADSL Transceiver-C 106 is housed in the DSLAM 124 along with a DSLAM splitter 126 and other components known to those skilled in the art.

The ADSL DMT receiver 502 is housed in the ADSL Transceiver-C 106, de-processing includes the tone ordered discrete multitone deinterleaving of the invention.

Figure 2:
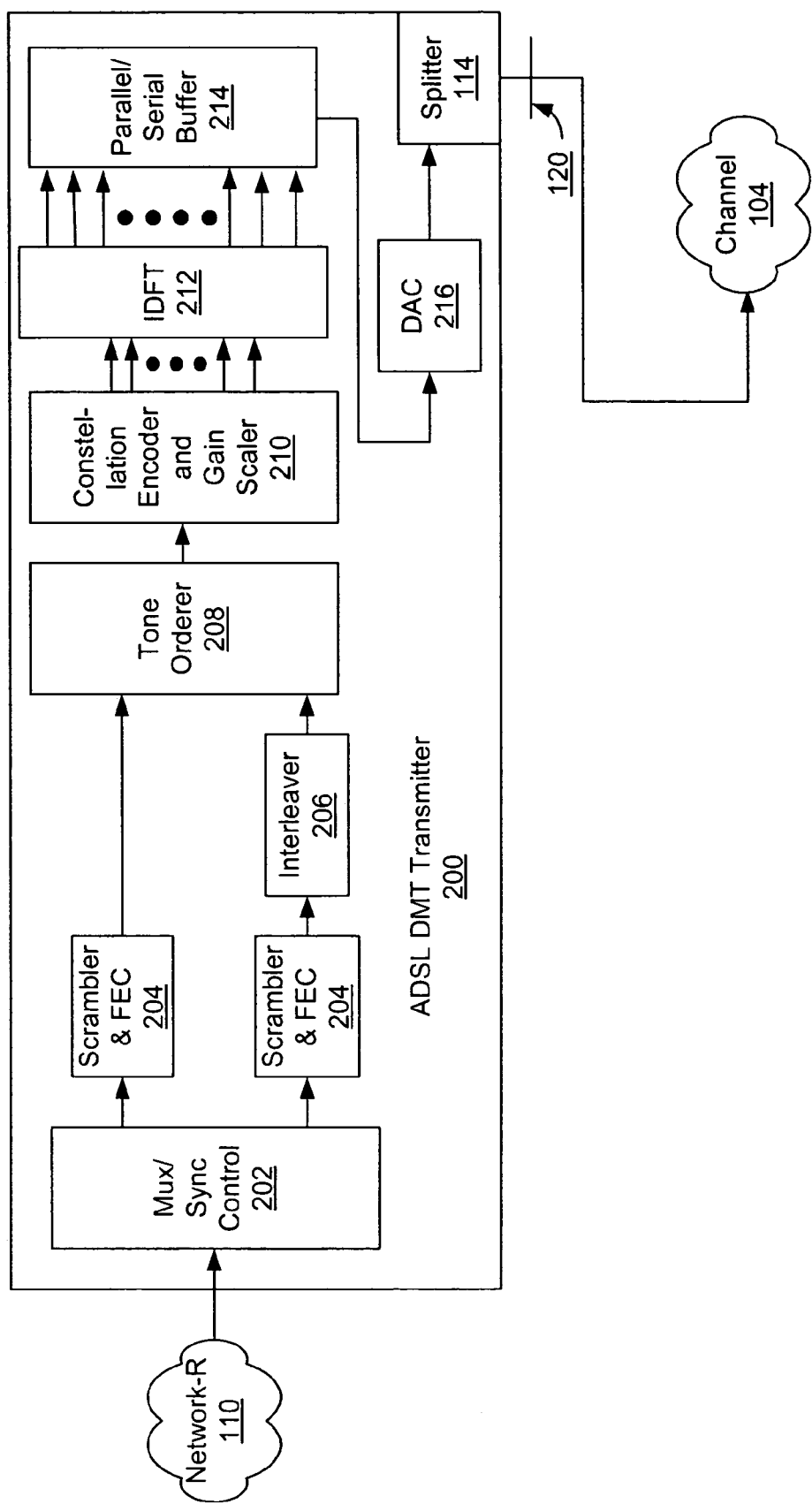
FIG. 2 is a block diagram of an ADSL DMT transmitter that resides in the ADSL remote transceiver and the ADSL central transceiver of FIG. 1. The ADSL DMT transmitter includes a tone ordering element.

FIG. 2 is a block diagram of an ADSL DMT transmitter 200 that resides in the ADSL Transceiver-R 102 and the ADSL Transceiver-C 106 of FIG. 1. The basic functional blocks of the ADSL DMT transmitter 200 are shown in FIG. 2. It should be noted that the components shown in FIG. 2 are not all required to construct a DMT transmitter. Instead, the components are models for facilitating the construction of DMT signal waveforms. Those waveforms may be constructed in a variety of ways including by hardware, software, and firmware.

The ADSL DMT transmitter 200 receives input(s) from service modules 108 or remote network(s) 110. The multiplexor synchronous control element (Mux/Sync Control) 202 accepts the inputs and converts the inputs into multiplexed and synchronized data frames (mux data frames). The multiplexor synchronous control element 202 generates the mux data frames at a nominal 4 k baud.

The mux data frame output of the multiplexor synchronous control element 202 passes to the tone ordering element 208 by one of two paths, each carrying a binary data stream. The first binary data stream is a "fast" path that provides low latency. The second binary data stream is interleaved and provides a low error rate and results in a higher latency. Both paths are processed by a scrambler and forward error corrector (FEC) 204. The tone ordering element 208 receives binary data stream input from two paths in this embodiment. However, it is not critical to the tone ordering element 208 how it receives input, or the form of the input, as long as the input is in the form of a bit stream, or can be converted into a bit stream.

The FEC is generally a Reed-Solomon coder. The scramblers, within the Scrambler & FECs 204, are applied to the binary data streams without reference to any framing or symbol synchronizations. Descrambling in the ADSL DMT receiver 502 can likewise be performed independent of symbol synchronization. The interleaved path is processed by an interleaver 206 in addition to a scrambler and FEC 204. The interleaver 206 convolutionally interleaves the Reed-Solomon codewords. The depth of the interleaving is a variable power of 2. The FEC can reliably correct occasional errors if the data is interleaved. However, the FEC is not effective in correcting all (sin x)/x distortion.

Both binary data stream paths are also processed by cyclical redundancy checks (CRCs) that are not shown in FIG. 2. The output of both paths is in the form of FEC data frames generated at the DMT symbol rate. An FEC data block may span more than one DMT symbol.

The fast and interleaved paths lead to the tone ordering element 208. The tone ordering element 208 combines data frames from the fast and the interleaved paths into combined tone ordered data symbols on tones. The tone ordering element 208 first places bits from the fast and interleaved paths into an original bit table $b_i$ and then orders the bits in an ordered bit table $b'_i$. Those skilled in the art will recognize that the original bit table $b_i$ and the ordered bit table $b'_i$ table may be any system, computer program, hardware device, memory element, or logic device, that organizes information in a readily retrievable manner.

The number of bits per tone and the relative gains to be used for every tone are calculated by the ADSL DMT receiver 502 and sent to the ADSL DMT transmitter 200 according to a protocol defined by ITU standards. The pairs of numbers, representing the bits per tone and the relative gains, are typically stored in ascending order of frequency or tone number i, in a bit and gain table. As with the original bit table $b_i$, and the ordered bit table $b'_i$ table, the bit and gain table may be any system, computer program, hardware device, memory element, or logic device, that organizes information in a readily retrievable manner. The bit and gain table may be two separate systems that are coordinated by any other device so that bit and gain information is available for the assignment of bits to tones. The bit and gain table is one means of providing bits and relative gain information. In this application, in the phrase "bits and relative gain information" the word "information" refers to "bits" and "relative gains" (information regarding the assignment of bits and the relative gains to be used for every tone)—in contrast to an interpretation of the phrase as "logical bits plus relative gain information."

The tone ordering element 208 first assigns bits from the fast path to the tones with the smallest number of bits assigned to them and then assigns the bits from the interleaved path to the remaining tones. All tones are encoded with the number of bits assigned to them. Therefore, some tones may have a mixture of bits from the fast and interleaved paths.

As described in ITU G.992.1, the ordered bit table $b'_i$ is based on the original bit table $b_i$ as follows for k=0 to 15:

First, From the bit and gain table, find the set of all i with the number of bits per tone $b_i$=k; and Second, assign $b_i$ to the ordered bit table $b'_i$ in ascending order of i.

Figure 3:
FIG. 3 is a graph showing an exemplar non-interleaving assignment of bits to tones as might be made by the tone ordering element. The non-interleaving assignment of bits to tones shows an assignment as might be made when the tone ordered discrete multitone interleaver is optionally disabled or as might be made in the prior art.

FIG. 3 is a graph showing an exemplar non-interleaving assignment of bits to tones as might be made by the tone ordering element 208 in the prior art or when the dynamically selectable tone ordering discrete multitone interleaver is not operational. As shown in FIG. 3, adjacent tones often carry the same number of information bits. Since all tones carrying the same number of information bits $b_i$ are trellis encoded consecutively by the constellation encoder and gain scaler 210, adjacent tones are generally not interleaved in the prior art.

Figure 4:
FIG. 4 is a graph showing an exemplar interleaving assignment of bits to tones using the tone ordered discrete multitone interleaver.
Figure 5:
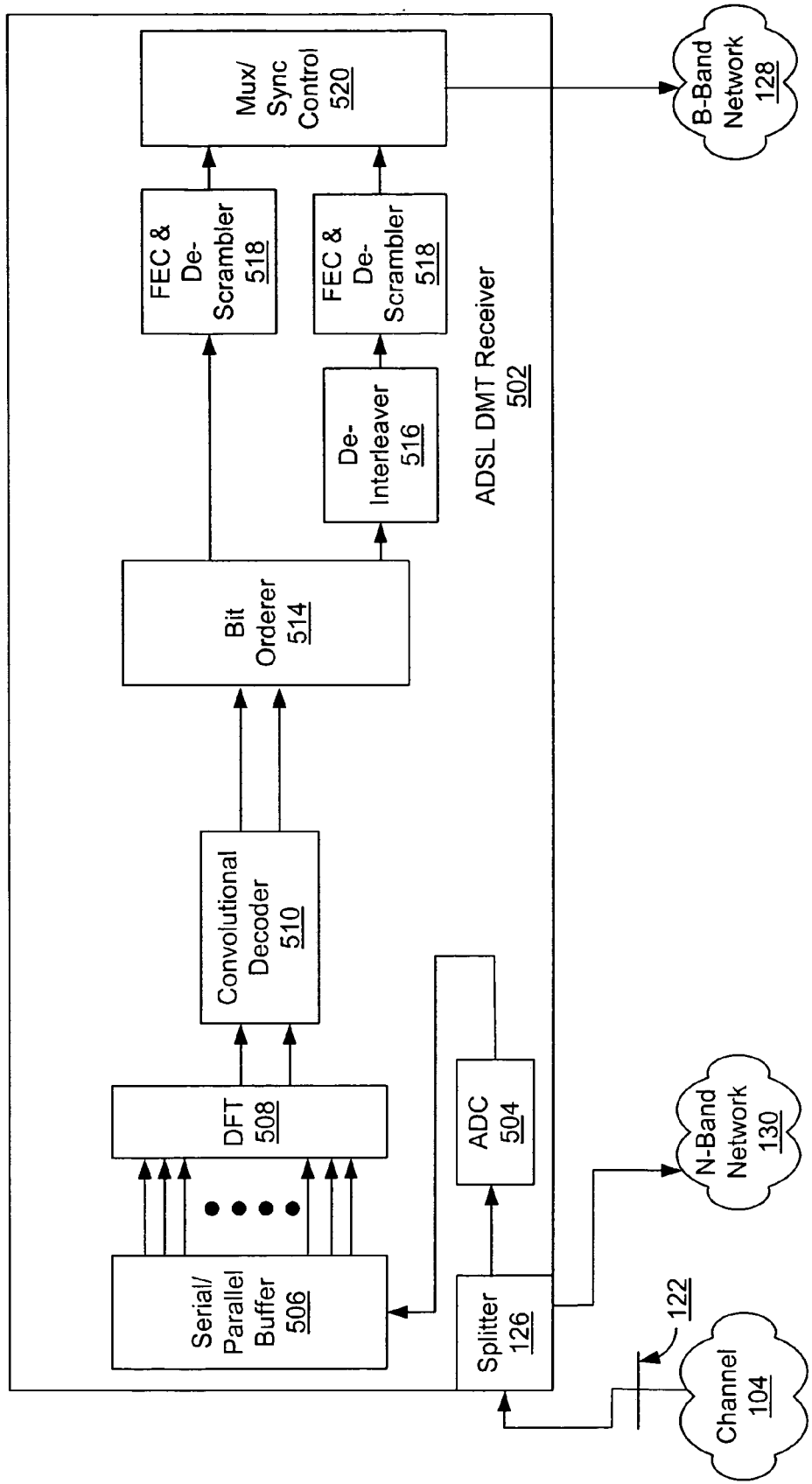
FIG. 5 is a block diagram of an ADSL DMT receiver that resides in the ADSL remote transceiver and the ADSL central transceiver of FIG. 1. The ADSL DMT receiver includes a bit ordering element.

FIG. 4 is a graph showing an exemplar interleaving assignment of bits to tones using the tone ordered discrete multitone interleaver. In contrast to the prior art, the tone ordered discrete multitone interleaver modifies the number of bits assigned to adjacent tone pairs so that adjacent tones have a different number of bits assigned to them. This may be accomplished by forcing the receiver to instruct the transmitter to modify the original bit density (the theoretical bit density that would have resulted without the use of the tone ordered discrete multitone interleaver) on alternate tones or tone pairs. This modification forces interleaving of adjacent tones when tones carrying the same number of information bits $b_i$ are trellis encoded consecutively. Those skilled in the art will recognize that it may not be necessary to calculate the original bit density for the tone ordered discrete multitone interleaver to assign bits to tones. Those skilled in the art will also recognize that it is not necessary to rely on the receiver to instruct the transmitter to modify the original bit density.

In ADSL, the trellis encoder in the constellation encoder and gain scaler 210 is a 4-dimensional trellis encoder in which one trellis symbol is encoded as two 2-dimensional (complex arithmetic) signals on two tones. Therefore, tone pairs may be encoded together then interleaved, or adjacent tones may be avoided. Turbo codes will also be improved with the tone ordered discrete multitone interleaver.

Several interleaving tone ordering modifications are available. Among the available modifications, three are noted. First, the constellation density may be reduced by one bit on every alternate tone that has an original bit density of $b_i$. This option will never cause a loss in margin but could reduce the data rate by 25%.

Second, the power gain scalars can be modified to compensate for the constellation density. An increase in power on some tones increases the density of those tones while a decrease in power on other tones decreases their density. This option results in a higher overall data rate.

Third, the tone ordered discrete multitone interleaver may be dynamically discriminatory. The receiver may identify specific sets of tones that are degraded by correlated noise and apply the tone ordered discrete multitone interleaver only to those tones. If the dynamically discriminatory tone ordered discrete multitone interleaver is enabled, then the trellis encoder, within the constellation encoder and gain scaler 210, will process the bits on selected tones in a new non-sequential order.

The tone ordered discrete multitone interleaver can be used in place of, or in addition to, the original tone ordering function which constructs the re-ordered bit allocation table $b'_i$. Regardless of which modification to the ordering of bits on tones is used, the modification may be dynamically selectable by the receiver when the receiver senses a degradation of the incoming signal due to correlated noise.

Those skilled in the art will recognize that where the tone ordered discrete multitone interleaver boosts power in one or more tones, a reduction in power in other tones will be required in order to return the system to equilibrium.

Though several embodiments of the tone ordered discrete multitone interleaver have been described, any system for selecting points out of order by switching the input to the convolutional encoder will effectively interleave the DMT data symbols. Selecting points out of order may be done on consecutive points or may be done randomly.

Returning to FIG. 2, the tone ordered data symbols are passed to the constellation encoder and gain scaler 210. The constellation encoder and gain scaler 210 converts the tone ordered data frames into coded bits on DMT tones. The constellation encoder and gain scaler 210 includes a convolutional encoder coset mapper as described in ITU (International Telecommunication Union) Recommendations G.992.1, Section 7.8. The constellational encoder, within the constellation encoder and gain scaler 210, is similar to a Quadrature Amplitude Modulation (QAM) encoder. The performance of the constellation encoder and gain scaler 210 is improved by block processing Wei's 16-state, 4-dimensional trellis code.

The coded bits on DMT tones from the constellation encoder and gain scaler 210 are passed on to the Inverse Discrete Fourier Transformer (IDFT) 212. The IDFT 212 combines the QAM constellations and converts the bits on the DMT tones to output samples. The output samples are converted to a serial stream by the parallel/serial buffer 214.

The serial stream from the parallel/serial buffer 214 is passed to a digital to analog converter (DAC) 216. The DAC 216 and associated analog processing blocks (not shown) construct a continuous transmit voltage waveform corresponding to the discrete digital input samples from the IDFT 212.

The analog signal passes through the splitter 114 and the loop interface remote terminal end 120 and enters the channel 104.

FIG. 5 is a block diagram of an ADSL DMT receiver 502 that resides in the ADSL remote transceiver 102 and the ADSL central transceiver 106 of FIG. 1. FIG. 5 includes a tone ordered discrete multitone deinterleaver for decoding and deinterleaving DMT symbols coded and interleaved by the tone ordered discrete multitone interleaver of FIGS. 1 and 2. The ADSL DMT receiver 502 receives an input signal at a splitter 126 from the channel 104 and through the loop interface central office end 122. The signal includes narrowband signals that are split by the splitter 126 and sent to the narrow band network 130.

The broadband portion of the signal from the channel 104 is processed by an analog to digital (ADC) converter 504 and a serial/parallel converter 506 and demodulated by a Discrete Fourier Transformer (DFT) element 508. DFT element 508 includes complimentary gain scaling to that in the transmitter constellation encoder and gain scaler 210. The DFT element 508 passes the demodulated signal to convolutional decoder 510. The convolutional decoder 510 includes a Viterbi decoder. The convolutional decoder 510 passes the output to a bit ordering element 514. The bit ordering element 514 performs a complementary re-ordering procedure from that performed by the tone ordering element 208 including performing a complimentary reordering procedure from that performed by the tone ordered discrete multitone interleaver. Those skilled in the art are able to determine the reordering procedure based on the performance of the tone ordering element 208.

The fast and the interleaved portions of the signal are segregated and sent down separate paths to the multiplexor synchronous control element 520. The interleaved path is processed by a deinterleaver 516 and an FEC and De-Scrambler 518. The fast path is only processed by an FEC and De-Scrambler 518. The multiplexor synchronous control element 520 passes the deinterleaved and convolutionally decoded signal to the broadband network 128.

Those skilled in the art will recognize there may be additional components involved in processing signals beyond those shown in the FIGS. 1, 2 and 5. In particular, there may be components involved in processing the signal between the DFT 508 and convolutional decoder 510 (with associated mapper); and between the convolutional decoder 510 and the bit ordering element 514. These additional components do not alter the basic invention as described in FIGS. 1–5.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the tone ordered discrete multitone interleaver without departing substantially from the spirit and principles of the invention. All such modifications and variations are intended to be included herein within the scope of this disclosure and the present invention and protected by the following claims.

The invention claimed is:

1. A transmitter comprising:
    a tone ordering element, wherein the tone ordering element is configured to assign bits to each tone in a plurality of tones according to bit and gain information;
    a memory containing the bit and gain information, the bit and gain information configured to associate each of at least a portion of a plurality of tones with a bit number, wherein the bit number associated with a first one of the tones is different from the bit number associated with a second one of the tones, where the first one of the tones is adjacent to the second one of the tones; and
    wherein each of the portion of the plurality of tones has an original bit density $b_i$, and wherein the bit and gain information is capable of designating a reduction of the original bit density b, by one on alternate tones within the portion of the plurality of tones.

2. The transmitter of claim 1, wherein the portion of the plurality of tones is selected based on correlated noise affecting the portion of the plurality of tones.

3. The transmitter of claim 1, wherein the bit and gain information is capable of being dynamically determined by a receiver.

4. A transmitting system comprising:
means for tone ordering, wherein the means for tone ordering is configured to assign bits to each of a plurality of tones
means for assigning a first number of bits to a first one of the tones and assigning a second number of bits to a second one of the tones, wherein the first number is different from the second number, wherein the first one of the tones is adjacent to the second one of the tones; and
wherein each of the plurality of tones has an original bit density $b_i$, and wherein the means for assigning is capable of designating a reduction of the original bit density $b_i$ by one on alternate tones within the plurality of tones.

5. The transmitting system of claim 4, wherein the means for assigning is capable of being dynamically determined by a receiver.

6. The transmitting system of claim 4, wherein the portion of the plurality of tones is selected based on correlated noise affecting the portion of the plurality of tones.

7. A method for transmitting data, comprising the steps of:
receiving bits and relative gain information, wherein the bits and relative gain information designates a variable number of bits to be assigned to each of a plurality of tones; and
assigning a first number of bits to a first one of the tones and assigning a second number of bits to a second one of the tones, wherein the first number is different from the second number, wherein the first one of the tones is adjacent to the second one of the tones; and
wherein each of the plurality of tones has an original bit density b, and wherein the bits and relative gain information designates a reduction of the original bit density $b_i$ by one on alternate tones.

8. The method of claim 7, wherein the first and second tones are selected based on correlated noise affecting the first and second tones.

9. The method of claim 7, wherein the bits and relative gain information is dynamically calculated by a receiver.

10. A receiver, comprising:
a convolutional decoder, the convolutional decoder cable of outputting convolutionally decoded tone ordered interleaved data;
a bit ordering element, wherein the bit ordering element is capable of re-ordering the convolutionally decoded tone ordered interleaved data;
wherein a transmitter supplies the data to the receiver and the transmitter codes the data with a tone ordering element and a bit and gain table, wherein the tone ordering element is capable of assigning bits to a plurality of tones and the bit and gain table is capable of designating that within a portion of the plurality of tones a first number of bits is assigned to each of the plurality of tones, and wherein the first number of bits assigned to each of the plurality of tones is different from a second number of bits assigned to each adjacent tone; and
wherein each of the plurality of tones has an original bit density $b_i$, and wherein the bit and gain table is capable of designating a reduction of the original bit density $b_i$ by one on alternate tones within the plurality of tones.

11. The receiver of claim 10, wherein the portion of the plurality of tones is selected based on correlated noise affecting the portion of the plurality of tones.

12. A transmitter comprising:
memory containing bit and gain information, the bit and gain information configured to associate each of a plurality of tones with a number of bits; and
a tone ordering element configured to assign bits from a data frame to the tones, the tone ordering element comprising:
logic for assigning bits, each of the bits to one of the tones according to the bit and gain information to produce an ordered bit table; and
logic for modifying at least a portion of the assignments from the ordered bit table such that adjacent tones have different bit densities.

13. The transmitter of claim 12, further including:
logic for selecting the portion based on correlated noise affecting the plurality of tones.

14. The transmitter of claim 12, wherein the bit and gain information is capable of being set by a receiver.

15. The transmitter of claim 12, wherein the bit and gain information is capable of being dynamically set by a receiver.

16. The transmitter of claim 12, wherein the bit and gain information operates to boost the power on a first group of tones within the plurality of tones and to lower the power on a second group of tones within the plurality of tones.

17. A method for transmitting data comprising the steps of:
receiving bit and gain information, the bit and gain information configured to associate each of a series of tones with a bit density; and
assigning data bits from a data frame to at least a portion of the tones according to the bit and gain information to produce an ordered bit tablet; and
modifying at least a portion of the assignments from the ordered bit table such that adjacent tones have different bit densities.

18. The method of claim 17, wherein the received bit and gain information is capable of being set by a receiver.

19. The method of claim 17, wherein the received bit and gain information is capable of being dynamically set by a receiver.

20. The method of claim 17, further including the step of:
selecting the portion based on correlated noise affecting the plurality of tones.

21. The method of claim 17, wherein the bit and gain information operates to boost the power on a first group of tones within the plurality of tones and to lower the power on a second group of tones within the plurality of tones.

22. A computer-readable-medium having a computer program for transmitting data, the computer program comprising the steps of:
receiving bit and gain information, the bit and gain information configured to associate each of a plurality of tones with a bit density; and
assigning data bits to the tones according to the bit and gain information to produce an ordered bit table; and
interleaving those bits in the ordered bit table that are assigned to frequency-adjacent tones such that frequency-adjacent tones have different bit densities.

23. The computer-readable medium of claim 22, wherein the received bit and gain information is capable of being set by a receiver.

24. The computer-readable medium of claim 22, wherein the received bit and gain information is capable of being dynamically set by a receiver.

25. The computer-readable medium of claim 22, the computer program further including the step of:
    selecting the portion based on correlated noise affecting the plurality of tones.

* * * * *

UNITED STATES PATENT AND TRADEMARK OFFICE
CERTIFICATE OF CORRECTION

PATENT NO. : 7,088,781 B2  
APPLICATION NO. : 09/766255  
DATED : August 8, 2006  
INVENTOR(S) : Betts It is certified that error appears in the above-identified patent and that said Letters Patent is hereby corrected as shown below:

Column 11, claim 7, line 41, delete "b," and insert --$b_i$,--.  
Column 12, claim 17, line 40, delete "tablet" and insert --table--.

Signed and Sealed this

Twenty-sixth Day of December, 2006

JON W. DUDAS  
*Director of the United States Patent and Trademark Office*